(12) United States Patent
Shiohara (10) Patent No.: US 7,637,834 B2
(45) Date of Patent: Dec. 29, 2009

(54) TRANSMISSION (75) Inventor: Masaki Shiohara, Komatsu (JP)

(73) Assignee: Komatsu Ltd., Tokyo (JP)

( * ) Notice: Subject to any disclaimer, the term of this patent is extended or adjusted under 35 U.S.C. 154(b) by 420 days.

(21) Appl. No.: 11/796,021

(22) Filed: Apr. 26, 2007

(65) Prior Publication Data
US 2008/0070737 A1 Mar. 20, 2008

(30) Foreign Application Priority Data
May 10, 2006 (JP) ............................. 2006-131189

(51) Int. Cl.
F16H 57/04 (2006.01)
(52) U.S. Cl. ......................................... 475/159; 184/6.1
(58) Field of Classification Search ................. 475/159; 184/6.1, 6.12
See application file for complete search history.

(56) References Cited

U.S. PATENT DOCUMENTS 5,086,877 A * 2/1992 Synatschke et al. .......... 184/7.4
5,478,292 A * 12/1995 Sato et al. .................... 475/293
6,068,569 A * 5/2000 Redinger et al. ............. 475/159
6,350,215 B1 * 2/2002 Gierling ....................... 475/159
2005/0263352 A1 * 12/2005 Fideler et al. ................ 184/6.1

FOREIGN PATENT DOCUMENTS

JP 10-141480 A 5/1998

* cited by examiner

Primary Examiner—Sherry Estremsky
(74) Attorney, Agent, or Firm—Frishauf, Holtz, Goodman & Chick, P.C.

(57) ABSTRACT

To provide a transmission capable of: reducing horsepower loss by reducing the amount of lubricating oil for a power transmission system including speed gears when the present speed gear is a specified gear of the speed gears; and securing the lubricating oil amount for the transmission system during a shift performed when the present gear is the specified speed gear. The transmission includes: the power transmission system; a lubricating oil amount reducing mechanism for reducing the lubricating oil amount supplied to the power transmission system when the present gear is the specified speed gear; and controller for determining a shift point vehicle speed pertaining to the specified speed gear based on a preset shift map, and activating the oil amount reducing mechanism, when a difference between the shift point vehicle speed and actual vehicle speed exceeds a first predetermined value and while the specified speed gear is the present gear.

4 Claims, 5 Drawing Sheets

TRANSMISSION

FIELD OF THE INVENTION

The present invention relates to a transmission suitable for, for example, a work vehicle such as a dump truck.

BACKGROUND ART

A conventional transmission of the above type includes: a power transmission system having a plurality of speed gears (e.g. forward first to seventh speed gears and reverse first and second speed gears); and a lubricating oil amount reducing mechanism for reducing the amount of lubricating oil supplied to the power transmission system. When the present speed gear of this transmission is a specified speed gear of the plurality of speed gears (for example, the forward sixth or seventh speed gear which involves a relatively small load), the lubricating oil amount reducing mechanism is activated to reduce the amount of lubricating oil, thereby reducing loss of horsepower.

However, this conventional transmission has the following problem. When the present speed gear is the above-mentioned specified speed gear, a shift is performed with the amount of lubricating oil reduced by the lubricating oil amount reducing mechanism, so that the power transmission system runs short of the lubricating oil at the time of the shift and thus may result in reduced durability of the power transmission system.

The present invention is directed toward solving such a problem and aims to provide a transmission capable of: reducing loss of horsepower by reducing the amount of lubricating oil supplied to a power transmission system when the present speed gear is a specified speed gear; and securing the amount of lubricating oil for the power transmission system at the time of a shift performed when the present speed gear is the specified speed gear.

SUMMARY OF THE INVENTION

To achieve the above object, a transmission according to the invention includes:

a power transmission system including a plurality of speed gears;

a lubricating oil amount reducing mechanism for reducing an amount of lubricating oil supplied to the power transmission system when a specified speed gear of the plurality of speed gears is a present speed gear; and a controller for determining a shift point vehicle speed pertaining to the specified speed gear based on a preset shift map, and activating the lubricating oil amount reducing mechanism, when a difference between the shift point vehicle speed and an actual vehicle speed exceeds a first predetermined value and while the specified speed gear is the present speed gear.

In the invention thus constructed, the lubricating oil amount reducing mechanism is activated to reduce the amount of lubricating oil supplied to the power transmission system when the difference between the shift point vehicle speed and the actual vehicle speed exceeds the first predetermined value and while the present speed gear is the specified speed gear. When a shift is performed as a result of the difference between the shift point vehicle speed and the actual vehicle speed becoming zero, the lubricating oil amount reducing mechanism is deactivated, whereby the amount of lubricating oil is secured for the power transmission system at the time of the shift. The invention can reduce loss of horsepower by reducing the amount of lubricating oil supplied to the power transmission system when the present speed gear is the specified speed gear and can secure the amount of lubricating oil for the power transmission system at the time of shift performed when the present speed gear is the specified speed gear.

In the invention, it is preferable that the controller deactivate the lubricating oil amount reducing mechanism, when the difference between the shift point vehicle speed and the actual vehicle speed becomes less than a second predetermined value smaller than the first predetermined value and while the lubricating oil amount reducing mechanism is activated.

Setting the second predetermined value established as a criterion for deactivation of the lubricating oil amount reducing mechanism smaller than the first predetermined value established as a criterion for activation of the lubricating oil amount reducing mechanism provides a difference between these values and thus has the advantage of preventing so-called hunting, repetition of activation and deactivation of the lubricating oil amount reducing mechanism.

In the invention, it is preferable that the controller deactivate the lubricating oil amount reducing mechanism when a predetermined time has elapsed after a switchover to the specified speed gear.

Deactivating the lubricating oil amount reducing mechanism when the predetermined time has elapsed after the switchover to the specified speed gear can prevent without fail the power transmission system from running short of the lubricating oil in cases where the specified speed gear is used continuously.

DETAILED DESCRIPTION OF THE INVENTION

A concrete exemplary embodiment of a transmission according to the present invention is demonstrated hereinafter with reference to the accompanying drawings. The following embodiment is an example in which the invention is applied to a transmission mounted on a dump truck as a work vehicle. However, the invention is not limited to this and can also be applied to a transmission mounted on other work vehicles such as a wheel loader and a bulldozer.

Figure 1:
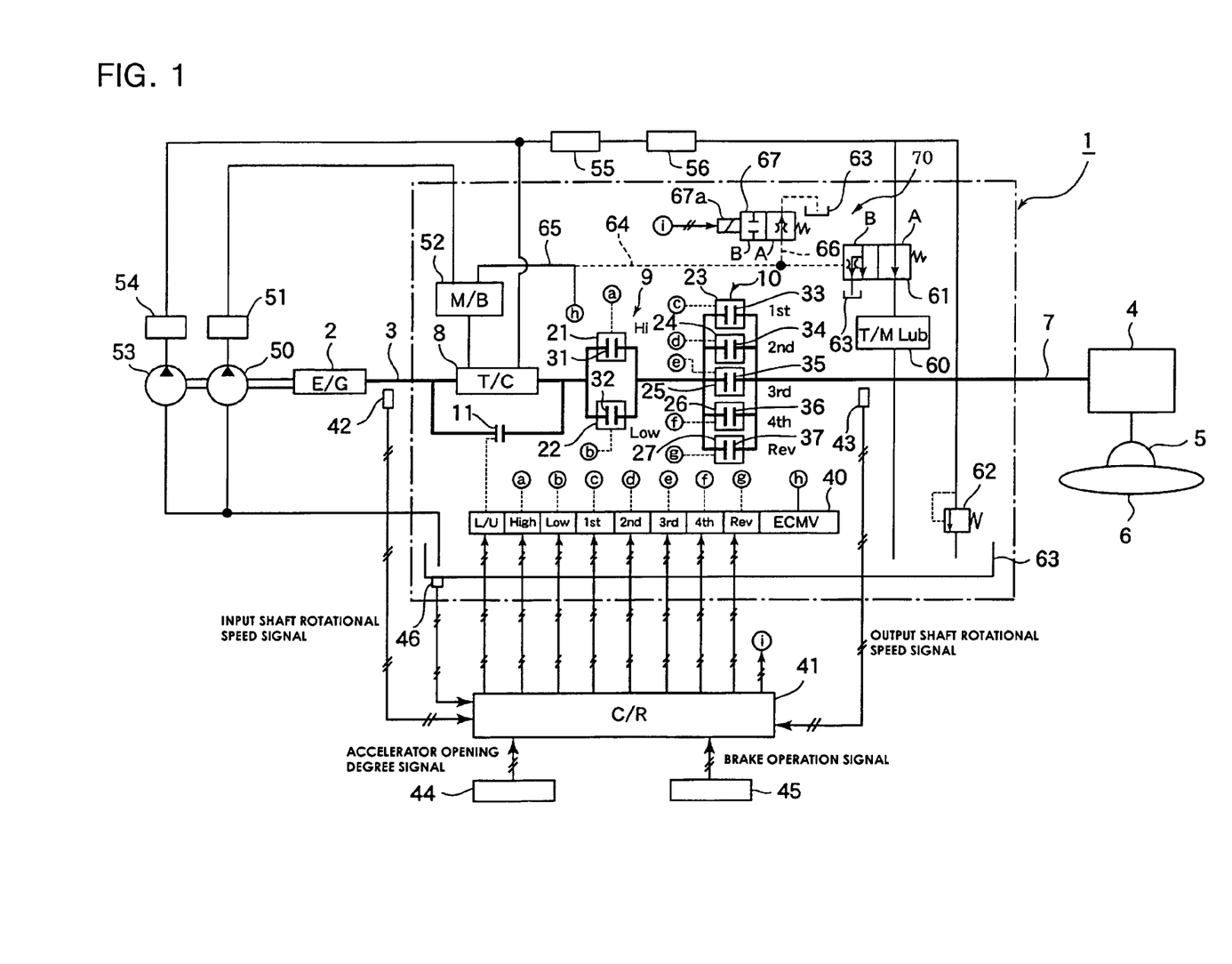
FIG. 1 schematically shows a system configuration of a transmission in accordance with an exemplary embodiment of the invention.

FIG. 1 schematically shows a system configuration of the transmission in accordance with the exemplary embodiment of the invention.

Transmission 1 shown in FIG. 1 is a planetary gear type automatic transmission including input shaft 3 connected to an output shaft of engine 2, and output shaft 7 coupled to drive wheel 6 through differential gear 4 and final reduction gear 5. A power transmission system between input shaft 3 and output shaft 7 includes torque converter 8, auxiliary transmission 9 and main transmission 10 provided in this order from the side of input shaft 3. Power from engine 2 is thus transmitted to drive wheel 6 by way of input shaft 3, torque converter 8, auxiliary transmission 9, main transmission 10, output shaft 7, differential gear 4 and final reduction gear 5. Torque converter 8 is provided with hydraulically operated lock-up clutch 11 which establishes a connection or a disconnection between a pump and a turbine of torque converter 8.

Auxiliary transmission 9 is formed of first gear train 21, second gear train 22, No. 1 clutch (Hi) 31 corresponding to gear train 21 and No. 2 clutch (Low) 32 corresponding to gear train 22. On the other hand, main transmission 10 is formed of third gear train 23, fourth gear train 24, fifth gear train 25, sixth gear train 26, seventh gear train 27, No. 3 clutch (1st) 33 corresponding to gear train 23, No. 4 clutch (2nd) 34 corresponding to gear train 24, No. 5 clutch (3rd) 35 corresponding to gear train 25, No. 6 clutch (4th) 36 corresponding to gear train 26 and No. 7 clutch (Rev) 37 corresponding to gear train 27. It is to be noted here that No. 1 to No. 7 clutches 31 to 37 are hydraulically operated friction clutches. When some of these clutches 31 to 37 are engaged by being acted upon by operating pressure oil, the corresponding gear trains function as power transmission elements accordingly. These No. 1 to No. 7 clutches 31 to 37 are selectively operated based on combinations shown in TABLE 1 (which indicates operated clutches with circles), thereby providing forward first to seventh speed gears and reverse first and second speed gears. It is to be noted that the forward sixth speed gear or the forward seventh speed gear corresponds to "a specified speed gear" in the invention.

| | CLUTCHES | | | | | | |
|---|---|---|---|---|---|---|---|
| | Hi No. 1 | Low No. 2 | 1st No. 3 | 2nd No. 4 | 3rd No. 5 | 4th No. 6 | Rev No. 7 |
| FORWARD | | | | | | | |
| 1st SPEED GEAR | | | ◯ | ◯ | | | |
| 2nd SPEED GEAR | | | ◯ | | ◯ | | |
| 3rd SPEED GEAR | ◯ | | | ◯ | | | |
| 4th SPEED GEAR | | ◯ | | | | ◯ | |
| 5th SPEED GEAR | ◯ | | | | | ◯ | |
| 6th SPEED GEAR | | ◯ | | | | | ◯ |
| 7th SPEED GEAR | ◯ | | | | | | ◯ |
| REVERSE | | | | | | | |
| 1st SPEED GEAR | | | ◯ | | | | ◯ |
| 2nd SPEED GEAR | ◯ | | | | | | ◯ |

Lock-up clutch 11 and No. 1 to No. 7 clutches 31 to 37 are connected to electronically controlled modulation valves (hereinafter referred to as "ECMVs") 40, respectively. Each ECMV 40 itself is publicly known and is therefore not illustrated in detail in the drawing. Each ECMV 40 includes a pressure control valve hydraulically connected to corresponding clutch 31, 32, 33, 34, 35, 36 or 37 and an electromagnetic proportional valve for adjusting the magnitude of pilot pressure which activates the pressure control valve. The electromagnetic proportional valve is controlled in response to a command current from controller 41, whereby the gradually increased flow of operating pressure oil into corresponding clutch 31, 32, 33, 34, 35, 36 or 37 can be controlled.

Controller 41 is mainly composed of a microcomputer including a central processing unit (CPU), a memory for storing a specified program and various data and other peripheral devices. This controller 41 receives (1) an input shaft rotational speed signal as information about rotation of the engine from input shaft rotational speed detector 42 which detects rotational speed of input shaft 3, (2) an output shaft rotational speed signal as information about vehicle speed from output shaft rotational speed detector 43 which detects rotational speed of output shaft 7, (3) an accelerator opening degree signal from accelerator opening degree detector 44 which is provided to an accelerator pedal (not shown in the drawing) for detecting an accelerator opening degree, (4) a brake operation signal from brake operation detector 45 which is provided to a brake pedal (not shown in the drawing) for detecting an operation status (ON/OFF) of the brake pedal and (5) a lubricating oil temperature signal from lubricating oil temperature detector 46 which detects temperature of lubricating oil. In the present embodiment, the output shaft rotational speed signal is adopted as the information about the vehicle speed. However, since there is a linear relationship between the rotational speed of input shaft 3 (which is rotational speed of engine 2) and the vehicle speed when lock-up clutch 11 is engaged, it is possible to adopt the input shaft rotational speed signal as the information about the vehicle speed.

The memory of controller 41 stores the specified program created based on a flowchart of FIG. 3 (described later) and shift maps of, for example, FIGS. 2(a) and 2(b). The shift maps of FIGS. 2(a) and 2(b) are shift maps when the brake operation signal is OFF and has shift lines L1, L2, L3, L4 having as parameters the accelerator opening degree (%) and output shaft rotational speed (shift point vehicle speed) at which a shift is performed. In FIG. 2(a), shift line L1 is a shift line for an upshift from the forward sixth speed gear to the forward seventh speed gear, while shift line L2 is a shift line for a downshift from the forward seventh speed gear to the forward sixth speed gear. Upshift line L1 and downshift line L2 have their respective shift point vehicle speeds offset from each other to prevent shift hunting, repetition of the shifts between the forward sixth speed gear and the forward seventh speed gear. In FIG. 2(b), shift line L3 is a shift line for an upshift from the forward fifth speed gear to the forward sixth speed gear, while shift line L4 is a shift line for a downshift from the forward sixth speed gear to the forward fifth speed gear. Upshift line L3 and downshift line L4 have their respective shift point vehicle speeds offset from each other to prevent shift hunting, repetition of the shifts between the forward fifth speed gear and the forward sixth speed gear. Although not illustrated in the drawing, other speed gear switching patterns are also set in the form of shift maps in the same manner as the shift maps of FIGS. 2(a) and 2(b) and stored in the memory of controller 41.

Controller 41 calculates the shift point vehicle speed (an upshift point vehicle speed or a downshift point vehicle speed) based on the accelerator opening degree signal, the brake operation signal and the required shift map, and calculates an output signal for controlling the operating pressure oil for each clutch 31, 32, 33, 34, 35, 36 or 37.

A description is now provided of, for example, processing performed by controller 41 for the upshift from the forward sixth speed gear to the forward seventh speed gear when the present speed gear is the forward sixth speed gear with the brake operation signal being OFF. By using the accelerator opening degree signal from accelerator opening degree detector 44 and making reference to the shift map of FIG. 2(a), the upshift point vehicle speed is calculated. In cases where the accelerator opening degree is, for example, between α2% and α3%, Vsu is calculated as the upshift point vehicle speed from the shift map of FIG. 2(a). Next, when it is determined that the actual vehicle speed has reached upshift point vehicle speed Vsu based on the output shaft rotational speed signal from output shaft rotational speed detector 43, the output signals for controlling the operating pressure oil for clutches 31, 32 so as to engage No. 1 clutch 31 gradually and disengage No.

2 clutch 32 are calculated. Based on this calculation result, the command currents are output to respective ECMVs 40 corresponding to respective clutches 31, 32.

A description is next provided of, for example, processing performed by controller 41 for the downshift from the forward sixth speed gear to the forward fifth speed gear when the present speed gear is the forward sixth speed gear with the brake operation signal being OFF. By using the accelerator opening degree signal from accelerator opening degree detector 44 and making reference to the shift map of FIG. 2(b), the downshift point vehicle speed is calculated. In cases where the accelerator opening degree is, for example, between α1% and α4%, Vsd is calculated as the downshift point vehicle speed from the shift map of FIG. 2(b). Next, when it is determined that the actual vehicle speed has reached downshift point vehicle speed Vsd based on the output shaft rotational speed signal from output shaft rotational speed detector 43, the output signals for controlling the operating pressure oil for clutches 31, 32, 35, 36 so as to engage No. 1 clutch 31 gradually, disengage No. 2 clutch 32, engage No. 5 clutch 35 gradually and disengage No. 6 clutch 36 are calculated. Based on this calculation result, the command currents are output to respective ECMVs 40 corresponding to respective clutches 31, 32, 35, 36.

Controller 41 has a built-in timer so as to be able to measure a time elapsed since selection of each speed gear, a time elapsed since completion of the shift and others.

Referring mainly to FIG. 1, a description is provided hereinafter of a hydraulic system of transmission 1 in accordance with the present embodiment.

The pressure oil from first hydraulic pump 50 driven by engine 2 is supplied through filter 51 to main valve 52 included in transmission 1. Part of the pressure oil supplied to this main valve 52 is supplied to torque converter 8 while the rest of the pressure oil is supplied to each ECMV 40 as a hydraulic source for each ECMV 40. The pressure oil from second hydraulic pump 53 driven by engine 2 is supplied through filter 54 to retarder brake (oil-cooled wet-type multidisc brake) 55, and the pressure oil passing through this retarder brake 55 is introduced into oil cooler 56.

In transmission 1 of this embodiment, lubricating oil circuit 60 is provided to circulate the lubricating oil through the power transmission system between input shaft 3 and output shaft 7. The lubricating oil is supplied to this lubricating oil circuit 60, thereby lubricating and cooling gear trains 21 to 27 and clutches 31 to 37. Between this lubricating oil circuit 60 and oil cooler 56, there is interposed lubricating oil amount switching valve 61 through which part of the pressure oil cooled by oil cooler 56 is supplied to lubricating oil circuit 60, while the rest of the pressure oil cooled by oil cooler 56 is drained through relief valve 62 into oil pan 63 of transmission 1.

Lubricating oil amount switching valve 61 is coupled through pilot pressure oil passage 64 to passage 65 which guides the pressure oil from main valve 52 to each ECMV 40. This lubricating oil amount switching valve 61 is also coupled to lubricating oil amount adjustable valve 67 through branch pilot pressure oil passage 66 branching off from pilot pressure oil passage 64. Switching of lubricating oil amount adjustable valve 67 is done as a result of input of a switch ON or OFF signal from controller 41 to operating unit 67a.

In cases where the signal output from controller 41 to operating unit 67a is the switch OFF signal, lubricating oil amount adjustable valve 67 is set in its A position shown in FIG. 1, whereby pilot pressure oil circulating through pilot pressure oil passage 64 is drained into oil pan 63. Accordingly, lubricating oil amount switching valve 61 is set in its A position shown in FIG. 1, whereby all the pressure oil supplied from oil cooler 56 to lubricating oil amount switching valve 61 is supplied to lubricating oil circuit 60. Here, the pressure oil (lubricating oil) supplied from lubricating oil amount switching valve 61 to lubricating oil circuit 60 is set at a specified flow rate (which is 280 L/min in the present embodiment and is hereinafter referred to as "a first specified flow rate") that allows sufficient lubrication and cooling of the gear trains and the clutches when the lower speed gear (i.e., the forward first, second, third, fourth or fifth speed gear) is selected.

In cases where the signal output from controller 41 to operating unit 67a is the switch ON signal, lubricating oil amount adjustable valve 67 is set in its B position shown in FIG. 1, whereby the pilot pressure oil circulating through pilot pressure oil passage 64 acts to exceed a threshold of actuation of lubricating oil amount switching valve 61. Accordingly, lubricating oil amount switching valve 61 is set in its B position shown in FIG. 1, whereby part of the pressure oil supplied from oil cooler 56 to lubricating oil amount switching valve 61 is drained through a throttle passage into oil pan 63, while the rest is supplied to lubricating oil circuit 60. Here, the pressure oil (lubricating oil) supplied from lubricating oil amount switching valve 61 to lubricating oil circuit 60 is set at a specified flow rate (which is 240 L/min in this embodiment and is hereinafter referred to as "a second specified flow rate") that is smaller than the first specified flow rate and allows sufficient lubrication and cooling of the gear trains and the clutches when the higher speed gear (i.e., the forward sixth or seventh speed gear) is selected.

In this way, lubricating oil amount switching valve 61 and lubricating oil amount adjustable valve 67 form lubricating oil amount reducing mechanism 70 which reduces the amount of lubricating oil supplied to the power transmission system.

It is to be noted that controller 41 corresponds to "a controller" in the invention, and its function is implemented when the CPU runs the specified program created based on the flowchart of FIG. 3 (described later). "Activating the lubricating oil amount reducing mechanism" in the invention means that the switch ON signal is output from controller 41 to operating unit 67a of lubricating oil amount adjustable valve 67, and "deactivating the lubricating oil amount reducing mechanism" in the invention means that the switch OFF signal is output from controller 41 to operating unit 67a of lubricating oil amount adjustable valve 67.

Referring mainly to the flowchart of FIG. 3 and referring to FIGS. 1, 2 and 4 on an as needed basis, a description is provided hereinafter of lubricating oil amount switching operation of transmission 1 constructed as described above. In FIG. 3, reference marks S denote steps. A state in which lubricating oil amount adjustable valve 67 is switched off in step S7 (described later) is referred to as "a switch OFF-1 state", while a state in which lubricating oil amount adjustable valve 67 is switched off in step S9 (described later) is referred to as "a switch OFF-2 state". In the following description, the accelerator opening degree is within a range of α2% and α3% (see FIG. 2).

First, a determination is made as to whether lubricating oil amount adjustable valve 67 is now in the switch OFF-1 state or a switch ON state (S1). If lubricating oil amount adjustable valve 67 is in the switch OFF-1 state or the switch ON state, a determination is made as to whether the present speed gear is the forward sixth speed gear or the forward seventh speed gear (S2). If the present speed gear is the forward sixth speed gear or the forward seventh speed gear, a determination is made as to whether the time elapsed after the selection of the forward sixth or seventh speed gear is less than set value G (sec) (S3). If the time elapsed after the selection of the forward sixth or seventh speed gear is less than set value G (sec), a determination is made as to whether the temperature of the lubricating oil is not lower than set value E (° C.) (S4). If the temperature of the lubricating oil is not lower than set value E (° C.), a determination is made as to whether no shift is now being carried out (that is, no command current is now being output to ECMV 40) and whether the time elapsed after the completion of the shift is not less than set value F (sec) (S5).

If it is determined in step S1 that lubricating oil amount adjustable valve 67 is not in either the switch OFF-1 state or the switch ON state, that is to say, lubricating oil amount adjustable valve 67 is in the switch OFF-2 state, a determination is made as to whether a time elapsed since establishment of the switch OFF-2 state of lubricating oil amount adjustable valve 67 is less than set value H (sec) (S6). If the time elapsed after the establishment of the switch OFF-2 state of lubricating oil amount adjustable valve 67 is less than set value H (sec), the switch OFF-2 state is maintained (S9). If the time elapsed after the establishment of the switch OFF-2 state of lubricating oil amount adjustable valve 67 is not less than set value H (sec), lubricating oil amount adjustable valve 67 is updated to the switch OFF-1 state (S7).

If it is determined in step S2 that the present speed gear is one of the forward first to fifth speed gears and the reverse first and second speed gears or if it is determined in step S4 that the temperature of the lubricating oil is lower than set value E (° C.) or if it is determined in step S5 that the shift is now being carried out or that the time elapsed after the completion of the shift is less than set value F (sec), lubricating oil amount adjustable valve 67 is set in the switch OFF-1 state (S7). Lubricating oil amount adjustable valve 67 is thus set in its A position shown in FIG. 1, and the pilot pressure oil circulating through pilot pressure oil passage 64 is drained into oil pan 63, so that lubricating oil amount switching valve 61 is set in its A position shown in FIG. 1, whereby all the lubricating oil supplied from oil cooler 56 to lubricating oil amount switching valve 61 is supplied to lubricating oil circuit 60.

In cases where one of the forward first to fifth speed gears each involving a relatively large load is selected, the flow rate of the lubricating oil supplied from lubricating oil amount switching valve 61 to lubricating oil circuit 60 is set at the first specified flow rate (280 L/min), so that sufficient lubrication and cooling of the gear trains and the clutches can be carried out. Even during the shift and right after the completion of the shift, the flow rate of the lubricating oil supplied from lubricating oil amount switching valve 61 to lubricating oil circuit 60 is set at the first specified flow rate (280 L/min), so that the amount of lubricating oil can be secured without fail for the clutches at the time of the shift.

If it is determined in step S3 that the time elapsed after the selection of the forward sixth or seventh speed gear is not less than set value G (sec), the timer is cleared to zero (S8), and lubricating oil amount adjustable valve 67 is thereafter brought to the switch OFF-2 state (S9). This means that in cases where the forward sixth or seventh speed gear is used continuously, the amount of lubricating oil can be set at the first specified flow rate (280 L/min) for improved lubrication.

Figure 2:
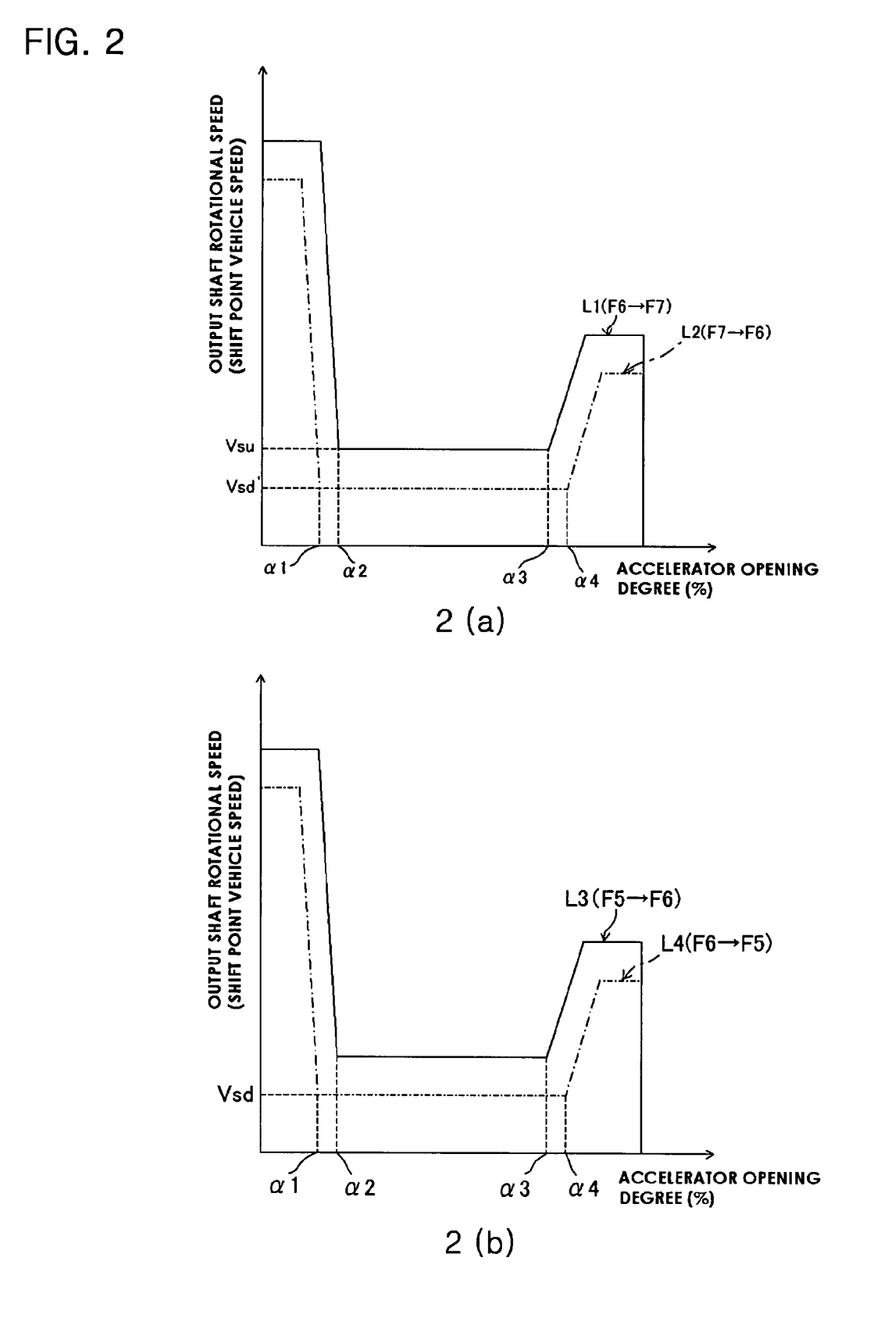
FIG. 2 illustrates shift maps when a brake is OFF.

If it is determined in step S5 that no shift is now being carried out and that the time elapsed after the completion of the shift is not less than set value F (sec), a determination is made using the shift point vehicle speeds (the upshift point vehicle speed and the downshift point vehicle speed), pertaining to the forward sixth speed gear or the forward seventh speed gear, and which are determined based on the shift maps of FIGS. 2(*a*) and 2(*b*), and actual vehicle speed Vr based on the output shaft rotational speed signal from output shaft rotational speed detector 43 whether the following expression (1) is satisfied (S10).

$$Vsd+C \leq Vr \leq Vsu-D \quad (1)$$

where Vsu is the upshift point vehicle speed, Vsd is the downshift point vehicle speed, and C and D are set values, each of which corresponds to "a second predetermined value" in the invention and is 30 rpm in this embodiment in terms of the rotational speed of the engine (T/M input shaft rotational speed).

Figure 4:
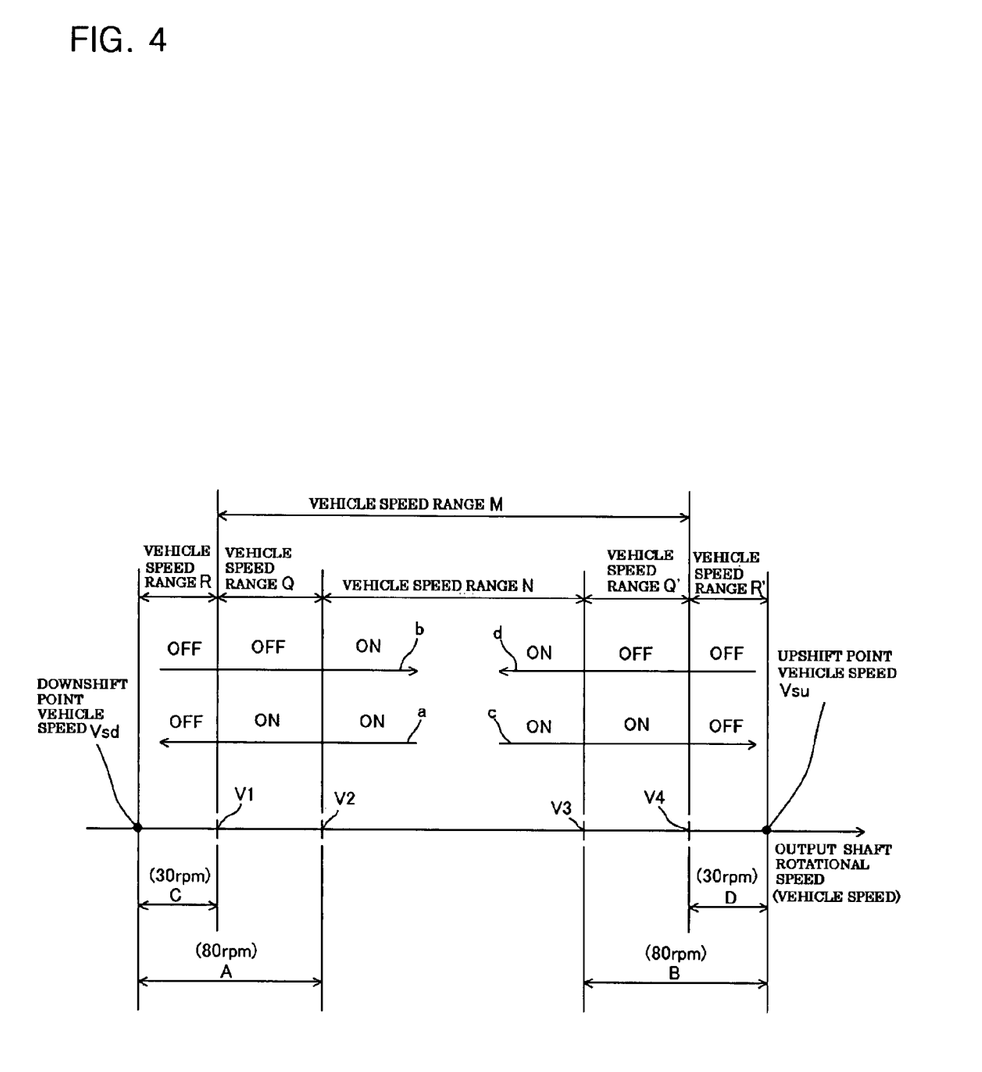
FIG. 4 explains switching timing of a lubricating oil amount adjustable valve.

In other words, a determination is made in step S10 whether a difference between shift point vehicle speed Vsd or Vsu and actual vehicle speed Vr is not less than set value (second predetermined value) C or D, that is, whether actual vehicle speed Vr is within vehicle speed range M (extending from V1 to V4) shown in FIG. 4.

If the present speed gear is the forward sixth speed gear, above-mentioned expression (1) is used for the determination in step S10. However, if the present speed gear is the forward seventh speed gear, there is no need to give consideration to the upshift, so that substantially the following expression (1)' is used for the determination in step S10.

$$Vsd'+C \leq Vr \quad (1)'$$

where Vsd' is the downshift point vehicle speed (see FIG. 2(*a*)).

If it is determined in step S10 that expression (1) or (1)' is not satisfied, lubricating oil amount adjustable valve 67 is set in the switch OFF-1 state (S7). This means that in cases where the difference between shift point vehicle speed Vsd or Vsu and actual vehicle speed Vr is less than 30 rpm in terms of the engine rotational speed (T/M input shaft rotational speed), the amount of lubricating oil is set at the first specified flow rate (280 L/min), so that the amount of lubricating oil can be secured without fail for the power transmission system at the time of the shift.

If it is determined in step S10 that expression (1) or (1)' is satisfied, a determination is made using the shift point vehicle speeds (the upshift point vehicle speed and the downshift point vehicle speed), pertaining to the forward sixth speed gear or the forward seventh speed gear, and which are determined based on the shift maps of FIGS. 2(*a*) and 2(*b*), and actual vehicle speed Vr based on the output shaft rotational speed signal from output shaft rotational speed detector 43 whether the following expression (2) is satisfied (S11).

$$Vsd+A \leq Vr \leq Vsu-B \quad (2)$$

where Vsu is the upshift point vehicle speed, Vsd is the downshift point vehicle speed, and A and B are set values, each of which corresponds to "a first predetermined value" in the invention and is 80 rpm in this embodiment in terms of the engine rotational speed (T/M input shaft rotational speed).

In other words, a determination is made in step S11 whether a difference between shift point vehicle speed Vsd or Vsu and actual vehicle speed Vr is not less than set value (first predetermined value) A or B, that is, whether actual vehicle speed Vr is within vehicle speed range N (extending from V2 to V3) shown in FIG. 4.

If the present speed gear is the forward sixth speed gear, above-mentioned expression (2) is used for the determination in step S11. However, if the present speed gear is the forward seventh speed gear, there is no need to give consideration to the upshift, so that substantially the following expression (2)' is used for the determination in step S11.

$$Vsd'+A \leq Vr \quad (2)'$$

where Vsd' is the downshift point vehicle speed (see FIG. 2(a)).

If it is determined in step S11 that expression (2) or (2)' is satisfied, lubricating oil amount adjustable valve 67 is set in the switch ON state (S12). Lubricating oil amount adjustable valve 67 is thus set in its B position shown in FIG. 1, causing the pilot pressure oil circulating through pilot pressure oil passage 64 to act to exceed the threshold of actuation of lubricating oil amount switching valve 61. Accordingly, lubricating oil amount switching valve 61 is set in its B position shown in FIG. 1, whereby part of the pressure oil supplied from oil cooler 56 to lubricating oil amount switching valve 61 is drained through the throttle passage into oil pan 63, while the rest is supplied to lubricating oil circuit 60. In this way, switching is performed to the second specified flow rate (240 L/min) smaller than the first specified flow rate (280 L/min), so that stirring resistance is reduced in the power transmission system, resulting in reduced loss of horsepower.

If it is determined in step S11 that expression (2) or (2)' is not satisfied, that is to say, actual vehicle speed Vr is within vehicle speed range Q or Q' shown in FIG. 4, a determination is made whether lubricating oil amount adjustable valve 67 is in the switch ON state now (S13). If lubricating oil amount adjustable valve 67 is in the switch ON state now, the switch ON state is maintained (S12). If lubricating oil amount adjustable valve 67 is not in the switch ON state now, that is to say, lubricating oil amount adjustable valve 67 is in the switch OFF-1 state, the switch OFF-1 state is maintained (S7).

Figure 3:
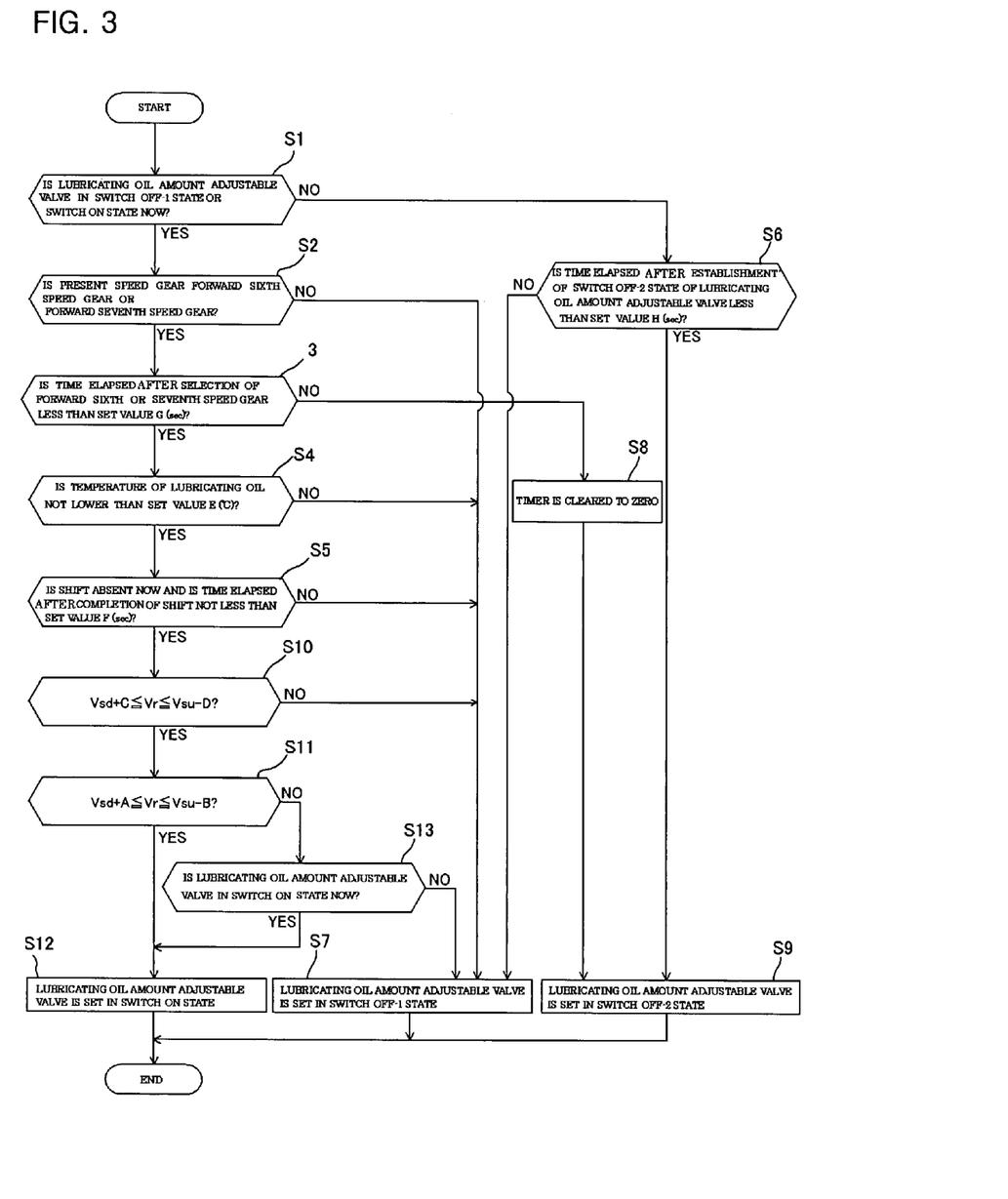
FIG. 3 is a flowchart explaining lubricating oil amount switching operation.

Assuming, for example, that the vehicle decelerates from vehicle speed range N toward downshift point vehicle speed Vsd with the forward sixth speed gear being the present speed gear (see arrow a in FIG. 4), lubricating oil amount adjustable valve 67 is in the switch ON state when the actual vehicle speed is within vehicle speed range N (see the flow from S11 to S12 in FIG. 3), lubricating oil amount adjustable valve 67 is in the switch ON state when the actual vehicle speed is within vehicle speed range Q (extending from V1 to V2) (see the flow from S11 via S13 to S12 in FIG. 3), and lubricating oil amount adjustable valve 67 is in the switch OFF-1 state when the actual vehicle speed is within vehicle speed range R (extending from Vsd to V1) (see the flow from S10 to S7 in FIG. 3). On the other hand, assuming that the vehicle accelerates from downshift point vehicle speed Vsd toward vehicle speed range N (see arrow b in FIG. 4), lubricating oil amount adjustable valve 67 is in the switch OFF-1 state when the actual vehicle speed is within vehicle speed range R (see the flow from S10 to S7 in FIG. 3), lubricating oil amount adjustable valve 67 is in the switch OFF-1 state when the actual vehicle speed is within vehicle speed range Q (see the flow from S11 via S13 to S7 in FIG. 3), and lubricating oil amount adjustable valve 67 is in the switch ON state when the actual vehicle speed is within vehicle speed range N (see the flow from S11 to S12 in FIG. 3). Moreover, assuming that the vehicle accelerates from vehicle speed range N toward upshift point vehicle speed Vsu with the forward sixth speed gear being the present speed gear (see arrow c in FIG. 4), lubricating oil amount adjustable valve 67 is in the switch ON state when the actual vehicle speed is within vehicle speed range N (see the flow from S11 to S12 in FIG. 3), lubricating oil amount adjustable valve 67 is in the switch ON state when the actual vehicle speed is within vehicle speed range Q' (extending from V3 to V4) (see the flow from S11 via S13 to S12 in FIG. 3), and lubricating oil amount adjustable valve 67 is in the switch OFF-1 state when the actual vehicle speed is within vehicle speed range R' (extending from V4 to Vsu) (see the flow S10 to S7 in FIG. 3). On the other hand, assuming that the vehicle decelerates from upshift point vehicle speed Vsu to vehicle speed range N (see arrow d in FIG. 4), lubricating oil amount adjustable valve 67 is in the switch OFF-1 state when the actual vehicle speed is within vehicle speed range R' (see the flow from S10 to S7 in FIG. 3), lubricating oil amount adjustable valve 67 is in the switch OFF-1 state when the actual vehicle speed is within vehicle speed range Q' (see the flow from S11 via S13 to S7 in FIG. 3), and lubricating oil amount adjustable valve 67 is in the switch ON state when the actual vehicle speed is within vehicle speed range N (see the flow from S11 to S12 in FIG. 3).

As described above, in vehicle speed range Q (or Q'), the switch ON/OFF state of lubricating oil amount adjustable valve 67 at the time of the vehicle's acceleration differs from that of valve 67 at the time of the vehicle's deceleration. If such vehicle speed range Q (or Q') is not provided, the so-called hunting, repetition of the ON and OFF states of lubricating oil amount adjustable valve 67, is caused during travel at around vehicle speed V1 or V2 (or at around vehicle speed V3 or V4). With vehicle speed ranges Q and Q' provided, such hunting can be prevented from occurring.

According to the present embodiment, when, with the present speed gear being the forward sixth or seventh speed gear, the difference between shift point vehicle Vsd or Vsu and actual vehicle speed Vr exceeds the first predetermined value (80 rpm in terms of the engine rotational speed), that is to say, actual vehicle speed Vr falls within vehicle speed range N (see FIG. 4), lubricating oil amount reducing mechanism 70 is activated, so that the amount of lubricating oil for the power transmission system is reduced when the forward sixth or seventh speed gear is the present speed gear, and loss of horsepower can be reduced accordingly. When the difference between shift point vehicle speed Vsd or Vsu and actual vehicle speed Vr is less than the second predetermined value (30 rpm in terms of the engine rotational speed), lubricating oil amount reducing mechanism 70 is deactivated, so that the amount of lubricating oil can be secured for the power transmission system at the time of shift performed when the forward sixth or seventh speed gear is the present speed gear. Since vehicle speed range Q (or Q') having a difference of 50 rpm in terms of the engine rotational speed between the first predetermined value established as a criterion for the activation of lubricating oil amount reducing mechanism 70 and the second predetermined value established as a criterion for the deactivation of lubricating oil amount reducing mechanism 70 is provided so that the switch ON/OFF state of lubricating oil amount adjustable valve 67 at the time of the vehicle's acceleration differs from that of valve 67 at the time of the vehicle's deceleration in vehicle speed range Q (or Q'), the hunting of lubricating oil amount adjustable valve 67 can be prevented from occurring, and lubricating oil amount reducing mechanism 70 can perform stable reduction of the amount of lubricating oil. When the predetermined time (set value G {sec}) has elapsed after the switchover to the forward sixth or seventh speed gear, lubricating oil amount reducing mechanism 70 is deactivated (see the flow from S3 via S8 to S9 in FIG. 3), so that the power transmission system can be prevented without fail from running short of the lubricating oil in cases where the forward sixth or seventh speed gear is used continuously.

Figure 5:
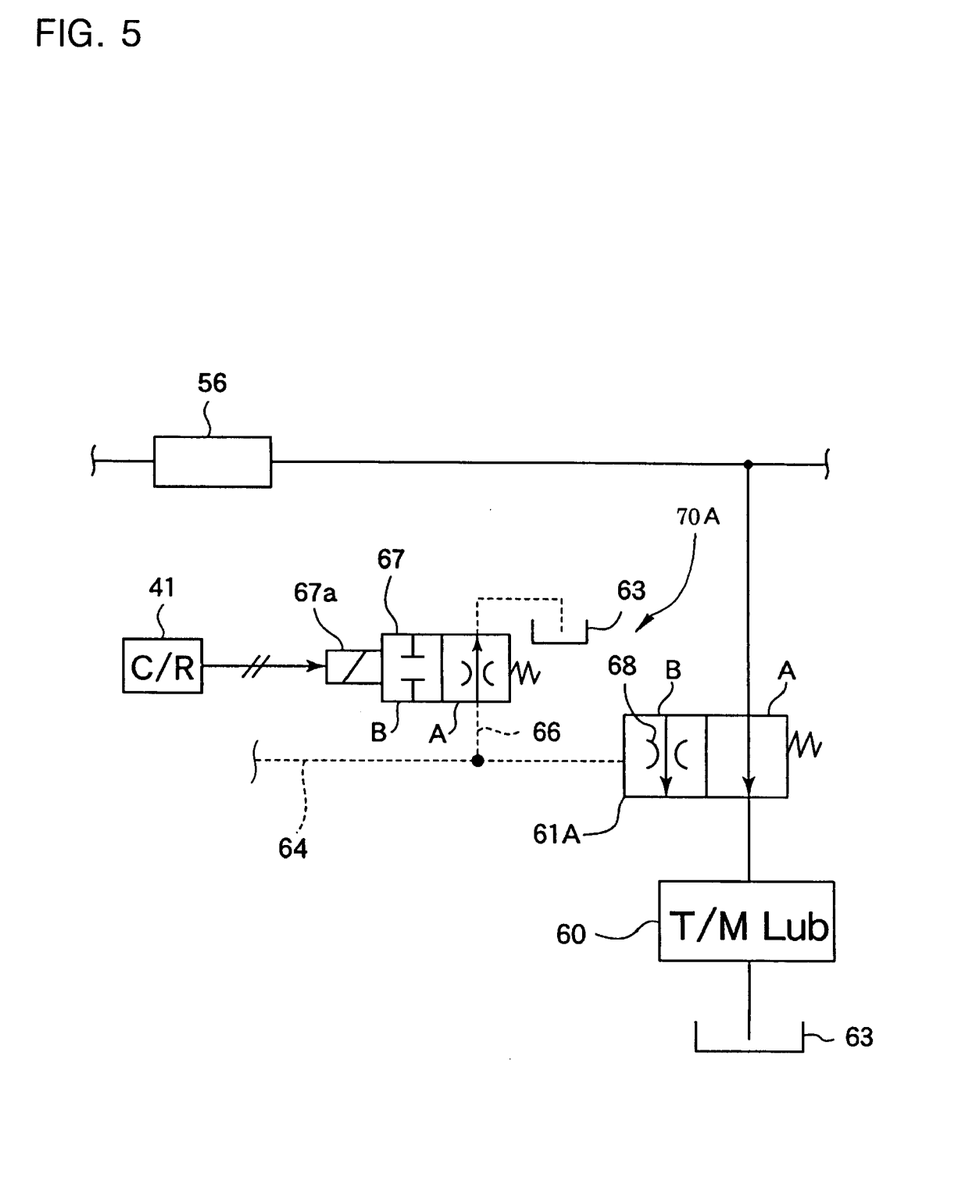
FIG. 5 illustrates a lubricating oil amount switching valve in another form.

The present embodiment gives the example in which when lubricating oil amount switching valve 61 is switched to its B position shown in FIG. 1, part of the lubricating oil supplied from oil cooler 56 to lubricating oil amount switching valve 61 is drained through the throttle passage into oil pan 63 for setting the lubricating oil supplied through this lubricating oil amount switching valve 61 to lubricating oil circuit 60 at the second specified flow rate. However, lubricating oil amount switching valve 61A shown in FIG. 5 can be adopted in place of lubricating oil amount switching valve 61. This lubricating oil amount switching valve 61A is similar to lubricating oil amount switching valve 61, except that this valve 61A has throttle 68 for adjusting the flow rate of the lubricating oil supplied from oil cooler 56 to lubricating oil amount switching valve 61A to the second specified flow rate when valve 61A is switched to its B position shown in FIG. 5.

What is claimed is:

1. A transmission comprising: a power transmission system including a plurality of speed gears;
    a lubricating oil amount reducing mechanism for reducing an amount of lubricating oil supplied to the power transmission system when a specified speed gear of the plurality of speed gears is a present speed gear; and
    a controller for determining a shift point vehicle speed pertaining to the specified speed gear based on a preset shift map, and activating the lubricating oil amount reducing mechanism, when a difference between the shift point vehicle speed and an actual vehicle speed exceeds a first predetermined value and while the specified speed gear is the present speed gear.

2. The transmission of claim 1, wherein the controller deactivates the lubricating oil amount reducing mechanism, when the difference between the shift point vehicle speed and the actual vehicle speed becomes less than a second predetermined value smaller than the first predetermined value and while the lubricating oil amount reducing mechanism is activated.

3. The transmission of claim 2, wherein the controller deactivates the lubricating oil amount reducing mechanism when a predetermined time has elapsed after a switchover to the specified speed gear.

4. The transmission of claim 1, wherein the controller deactivates the lubricating oil amount reducing mechanism when a predetermined time has elapsed after a switchover to the specified speed gear.

* * * * *